March 13, 1956 C. R. HOLTZ 2,737,771
LAWN MOWER ATTACHMENT
Filed July 7, 1953 2 Sheets-Sheet 1

INVENTOR.
CLARENCE R. HOLTZ
BY
ATTORNEY

March 13, 1956  C. R. HOLTZ  2,737,771
LAWN MOWER ATTACHMENT
Filed July 7, 1953  2 Sheets-Sheet 2

INVENTOR.
CLARENCE R. HOLTZ
BY
*Clinton L. Mathis*
ATTORNEY

2,737,771

LAWN MOWER ATTACHMENT

Clarence R. Holtz, Seattle, Wash.

Application July 7, 1953, Serial No. 366,441

5 Claims. (Cl. 56—253)

This invention relates to an attachment for lawnmowers of the reel type which are either hand or power operated.

Most reel type lawnmowers have laterally spaced side wheels, laterally spaced side wheel supporting means which are disposed inwardly of the side wheels and which extend rearwardly to normally support the roller governing the depth of cut and a tie rod extending between the side wheel supporting means and which tie rod is positioned forwardly of the rear end portion of the side wheel supporting means.

Another type of reel type lawnmower is provided with a deck or platform instead of a tie rod between the said side wheel supporting means. The latter type of reel type lawnmowers generally are power operated.

An object of this invention is to provide an attachment which may be readily mounted on lawnmowers presently on the market and which can be readily removed when desired.

Another object of the invention is to provide an attachment so that when a lawnmower is operated along the edge of a lawn and with a portion of the lawnmower overhanging the edge, the cut will be maintained at a desired level and the driving wheels of the lawnmower will be maintained at the horizontal even though only one driving wheel is supported.

Another object of my invention is to provide an attachment wherein I employ a third wheel which operates intermediate the two side wheels, forwardly of the two side wheels, adjustable to operate in various vertical planes between the two side wheels, and wherein the bottom portions of all of the said three wheels extend downwardly to substantially a common plane.

Other objects and advantages of my invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

Figure 1:
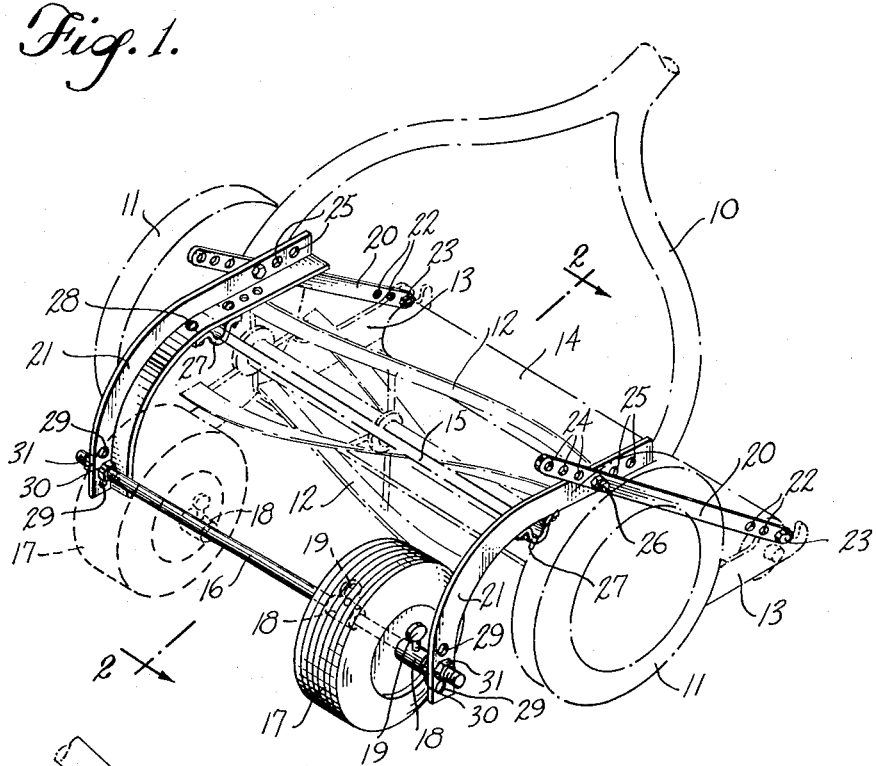
Figure 1 is a perspective view of a lawnmower, shown in dot and dash lines, equipped with my invention and with the third wheel shown in full and dotted lines to indicate adjustability.

Referring now to Fig. 1 of the drawings, the conventional parts of one type of lawnmower include the handle means 10, laterally spaced apart side wheels 11, reel type cutter 12, side wheel supporting members or means 13, roller 14, and tie rod 15 extending between spaced apart side wheel supporting means 13.

Figure 2:
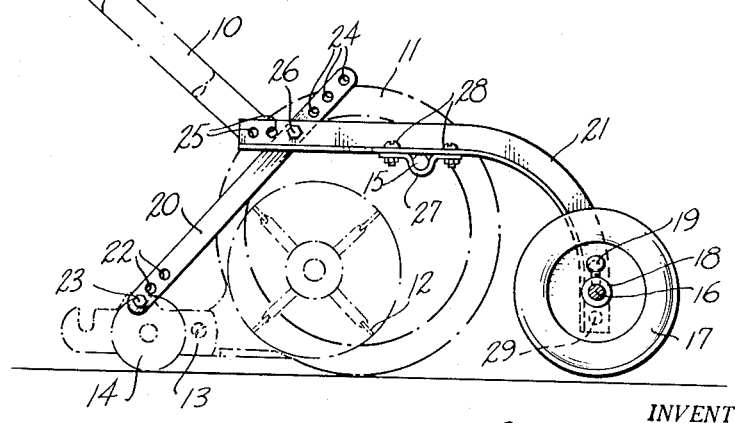
Fig. 2 is an elevational view taken substantially on broken line 2—2 of Fig. 1.

Now referring to the attachment which is shown in Figs. 1 and 2, I provide a cross shaft 16 disposed forwardly of the lawnmower and sufficiently forward so that the third wheel 17 will operate clear of the lawnmower reel. The third wheel 17 is mounted for rotation and this may be accomplished by having the cross shaft 16 fixed and the wheel 17 journaled on the cross shaft 16 or, if desired, suitable ball bearing and race construction may be employed between the wheel 17 and the cross shaft 16. To provide for longitudinal adjustment of the wheel 17 relative to the cross shaft 16 a simple expedient is the use of sleeves 18 and set screws 19.

Now referring to the construction in Figs. 1 and 2 for mounting said shaft 16, I provide on each side of the lawnmower frame members 20 and 21. I employ the two members 20 and 21 to form a frame structure rather than forming it from one piece as this permits adjustability and adaptability of my device to lawnmowers of varying sizes. However, of course, if the device were made for a particular lawnmower, the adjusting feature would not be needed.

I utilize the portion of the side wheel supporting means 13 to support one end portion of the frame member 20. Preferably the frame member 20 at its rear portion is provided with a plurality of openings 22 and one thereof, as selected, may be utilized and thus the frame member 20 bolted to the rear portion of the wheel supporting means 13 as by nut and bolt means 23.

The forward portion of the frame member 20 is also preferably provided with a plurality of holes 24. Also preferably the forward frame member 21 is provided with a plurality of openings or holes 25 at its rear end portion. Thus I may utilize selected holes of the holes 24 and 25 and align two thereof and connect the members 20 and 21 together by nut and bolt means 26.

Also I utilize the tie rod 15 in rigidly supporting the structure for carrying the cross shaft 16. A suitable way of accomplishing this is providing pipe straps 27 and securing the same to the frame member 21 as by nut and bolt means 28. Obviously U bolts may be employed in place of the said pipe straps 27. As frame members 20 and 21 operate between the side wheels 11 and over the reel type cutter 12, a construction must be provided to bridge the cutter 12 and at the same time provide the cross shaft 16 at a suitable level to thus inherently reduce the diameter of the third wheel 17.

Again for reasons of adjustability, I preferably provide a series of holes 29 in the forward portions of the frame members 21. One way of mounting shaft 16 in a set of holes 29 in frame members 21, is to provide a shaft 16 threaded on both ends and then to dispose one nut 30 on the inside of each frame member 21 and then place a nut 31 and lock washer on the outside of each frame member 21.

In order to retain an adjusted longitudinal position of the third wheel 17 on the shaft 16, I employ sleeve members 18 which are slidable on the shaft 16 and may be held in a desired adjusted position by set screws 19. By having a sleeve member 18 on either side of the hub of the wheel 17, the sleeves 18 may be moved longitudinally and a selected position obtained and then this selected position can be maintained by the said sleeves 18 and set screws 19. The reason for adjusting the wheel 17 longitudinally of the shaft 16 is that it will depend upon the direction of travel which of the wheels 11 may be overlying a bed and off of the edge of the lawn.

From the foregoing it is obvious that I have provided in combination with a lawnmower having laterally spaced side wheels, laterally spaced side wheel supporting means which are disposed inwardly of said side wheels and where there is a tie rod extending between the said side wheel supporting means and which tie rod is positioned forwardly of the rear end portions of the side wheel supporting means a device which will permit the lawnmower to maintain a level of cut and a balance when supported by the wheel 17 and either of the wheels 11.

Figure 3:
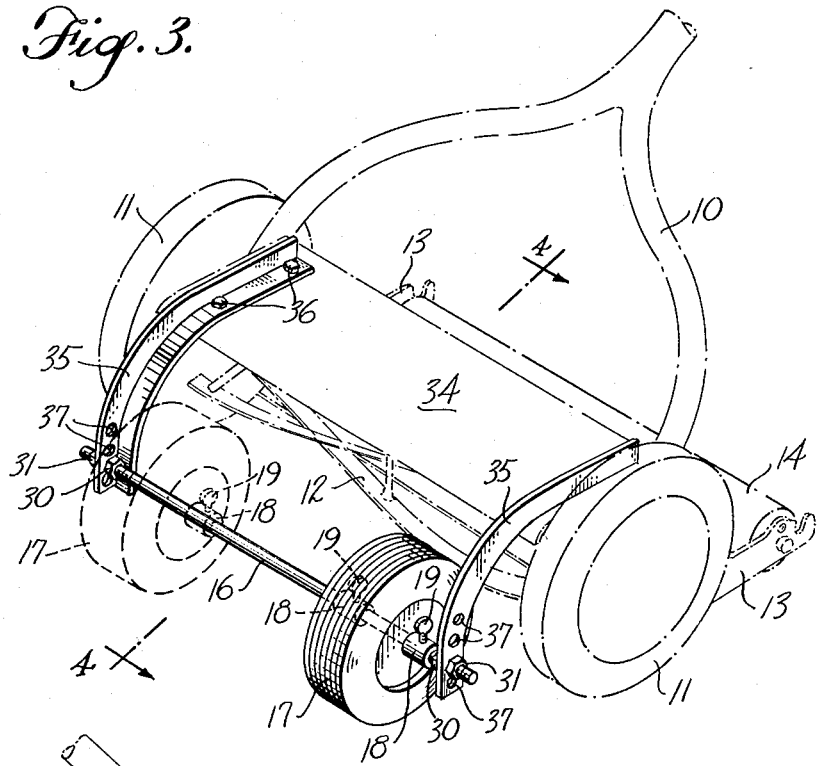
Fig. 3 is a view, similar to Fig. 1, of another type of lawnmower equipped with a modified form of my invention.
Figure 4:
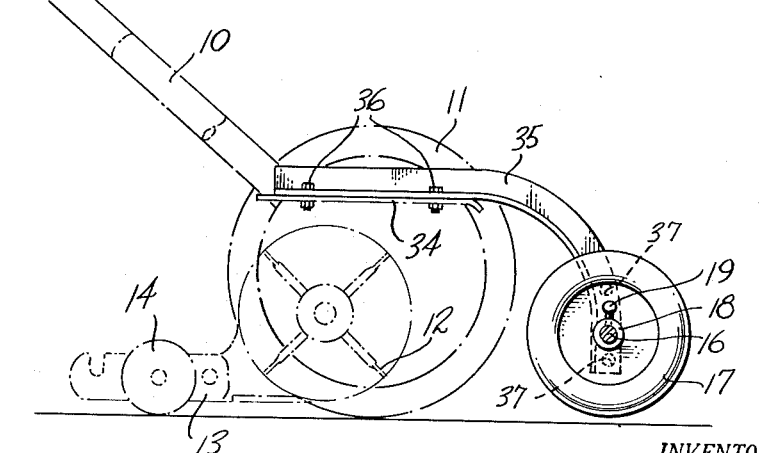
Fig. 4 is an elevational view taken substantially on broken line 4—4 of Fig. 3.

Referring now to the modified form of my invention set forth in Figs. 3 and 4 of the drawings, a lawnmower is shown having a deck portion 34. While the said lawnmower is not provided with a tie rod, the deck portion or a tie rod each function as a cross brace supporting structure. Generally power lawnmowers are provided with a deck type construction but many hand lawnmowers employ a similar construction. In the interest of simplicity I have employed the same numbers in Figs. 3 and 4 on parts which are similar to those illustrated in Figs. 1 and 2 of the drawings. Thus there is shown in Figs. 3 and 4 handle 10, side wheels 11, cutter 12, and roller 14. With such a type of lawnmower I employ frame members 35 on either side of the lawnmower and which frame members 35 are secured to the deck portion 34 as by nut and bolt means 36. These said frame members 35 extend forwardly and their forward end portions are provided with a plurality of openings 37 for receiving a cross shaft and third wheel which may be similar to the parts shown in Figs. 1 and 2 of the drawings and hence there is shown in Figs. 3 and 4 cross shaft 16, third wheel 17, nuts 30 and 31, sleeves 18, and set screws 19.

From the detailed description given in connection with the construction in Figs. 1 and 2 of the drawings, it is believed that the description just given regarding the simpler and modified form of my invention shown in Figs. 3 and 4 of the drawings will be readily understood by those skilled in this art.

Thus my invention defines the cross shaft 16 and the third wheel 17 slidable thereon so that I in effect provide a three wheel vehicle so that one side wheel and the third wheel will support the lawnmower even though one of the two wheels 11 is off the lawn or in other words it is not contacting a surface. In one form of construction I provide frame members 20 and 21 on either side of the lawnmower and they are preferably two pieces on either side of the lawnmower but obviously a single member on each side of the lawnmower would be useful. Also preferably the various adjustments indicated are provided. Also as to the construction of Figs. 1 and 2, pipe straps 27 or U-bolts are preferably employed as a means to connect an intermediate portion of the members 21 to the tie rod 15 of the lawnmower.

Now referring to the construction of Figs 3 and 4 of the drawings, I provide supporting means for the cross shaft 16 which again are frame members on either side of the lawnmower and which frame members are located inwardly of the side wheels 11 of the lawnmower. These frame members 35 extend forwardly of the lawnmower and support the cross shaft 16 and the wheel 17 thereon.

In either the construction shown in Figs. 1 and 2 or the construction shown in Figs. 3 and 4, I have shown a reel type lawnmower having among other characteristics a cross brace supporting structure which would include either the tie rod 15 or the deck portion 34. Also in each Figs. 1 and 2, there is the same cross rod 16 and the said cross rod 16 is disposed forwardly of the lawnmower to support the wheel 17. The means to support cross rod 16 comprises a cross brace supporting structure. In Figs. 1 and 2 the cross brace supporting structure comprises the members 21—20 on opposite end portions and the members 21 support the cross shaft 16 and the said members 21 are then secured to the cross shaft 15 of the device and is also secured (preferably) to the members 20 which in turn is supported at a rear portion of the side wheel supporting member or means 13. While the members 20 and 21 on each side of the machine may be in one piece, or preferably in two pieces, the two piece construction is preferable as it allows conversion of many types of lawnmowers to a lawnmower having having the improvement characteristics of my present invention.

Obviously changes may be made in the form, arrangement, and dimensions of the parts of my invention without departing from the principle thereof, the above setting forth only preferred forms of embodiment of my invention.

I claim:

1. In combination with a lawnmower having laterally spaced side wheels, laterally spaced side wheel supporting means disposed inwardly of said side wheels, and a tie rod extending between the said wheel supporting means and positioned forwardly of the rear end portions of said side wheel supporting means; a cross shaft mounted forwardly of the tie rod of the mower; two spaced apart cross shaft supporting structures each having a rear end portion connected with a rear end portion of one of said side wheel supporting means of the mower, a mid portion connected with the tie rod of the mower, and a forward portion connected with said cross shaft; and a third wheel mounted for rotary movement and carried by said cross shaft, the bottom portions of said third wheel and the side wheels of the mower extending downwardly to substantially a common plane.

2. In combination with a lawnmower having laterally spaced side wheels, laterally spaced side wheel supporting means disposed inwardly of said side wheels, and a tie rod extending between the said wheel supporting means and positioned forwardly of the rear end portions of said side wheel supporting means; a cross shaft mounted forwardly of the tie rod of the mower; two spaced apart cross shaft supporting structures each having a rear end portion connected with a rear end portion of one of said side wheel supporting means of the mower, a mid portion connected with the tie rod of the mower, and a forward portion connected with said cross shaft; a third wheel mounted for rotary movement and carried by said cross shaft, the bottom portions of said third wheel and the side wheels of the mower extending downwardly to substantially a common plane; and adjusting means between said third wheel and said cross shaft providing adjustable sliding movement of the said wheel on the said cross shaft.

3. In combination with a lawnmower having laterally spaced side wheels, laterally spaced side wheel supporting means disposed inwardly of said side wheels, and a tie rod extending between the said wheel supporting means and positioned forwardly of the rear end portions of said side wheel supporting means; a cross shaft mounted forwardly of the tie rod of the mower; two spaced apart cross shaft supporting structures each having a rear end portion detachably connected with a rear end portion of one of said side wheel supporting means of the mower, a mid portion carrying a detachable pipe strap which in turn is connected with the tie rod of the mower, and a forward portion detachably connected with said cross shaft; a third wheel slidable mounted on said cross shaft and mounted for rotary movement, the bottom portions of said third wheel and the side wheels of the mower extending downwardly to substantially a common plane; and adjusting means carried by said cross shaft determining any longitudinally adjusted position of said third wheel.

4. In combination with a lawn mower having laterally spaced side wheels, laterally spaced side wheel supporting means, and a tie rod extending between the said wheel supporting means and positioned forwardly of the rear end portions of said wheel supporting means; two spaced apart rear frame members disposed inwardly of said side wheels of the mower, each having a rear end portion connected to a rear end portion of one of said side wheel supporting means; a cross shaft mounted forwardly of the tie rod of the lawnmower; two spaced apart forward frame members disposed inwardly of said wheels of the mower, each having a rear end portion connected with a forward end portion of one of said rear frame members, a mid portion connected with the tie rod of the mower, and a forward portion connected with said cross shaft; and a third wheel carried by said cross shaft and mounted for rotary movement, the bottom portions of said third wheel and the two side wheels of the mower extending downwardly to substantially a common plane.

5. In combination with a lawn mower having laterally spaced side wheels, laterally spaced side wheel supporting means, and a tie rod extending between the said wheel supporting means and positioned forwardly of the rear end portions of said wheel supporting means; two spaced apart rear frame members disposed inwardly of said side wheels of the mower, each having a rear end portion detachably connected to a rear end portion of one of said side wheel supporting means; a cross shaft mounted forwardly of the tie rod of the lawnmower; two spaced apart forward frame members disposed inwardly of said side wheels of the mower and each having a rear end portion detachably connected with a forward end portion of one of rear frame members, a mid portion connected with the tie rod of the mower, and a forward portion connected with said cross shaft; a third wheel carried by said cross shaft and mounted for rotary movement; and adjusting means mounting said third wheel for movement longitudinally of said cross shaft providing for rotary movement of said third wheel in various vertical planes and intermediate the side wheels of the mower, the bottom portions of said third wheel and the two side wheels of the mower extending downwardly to substantially a common plane.

References Cited in the file of this patent

UNITED STATES PATENTS

| | | |
|---|---|---|
| 2,275,359 | Gargiule et al. | Mar. 3, 1942 |
| 2,485,312 | Powell | Oct. 18, 1949 |
| 2,644,290 | Andrew | July 7, 1953 |

FOREIGN PATENTS

| | | |
|---|---|---|
| 388,748 | Great Britain | Feb. 28, 1933 |